Patented Dec. 5, 1944

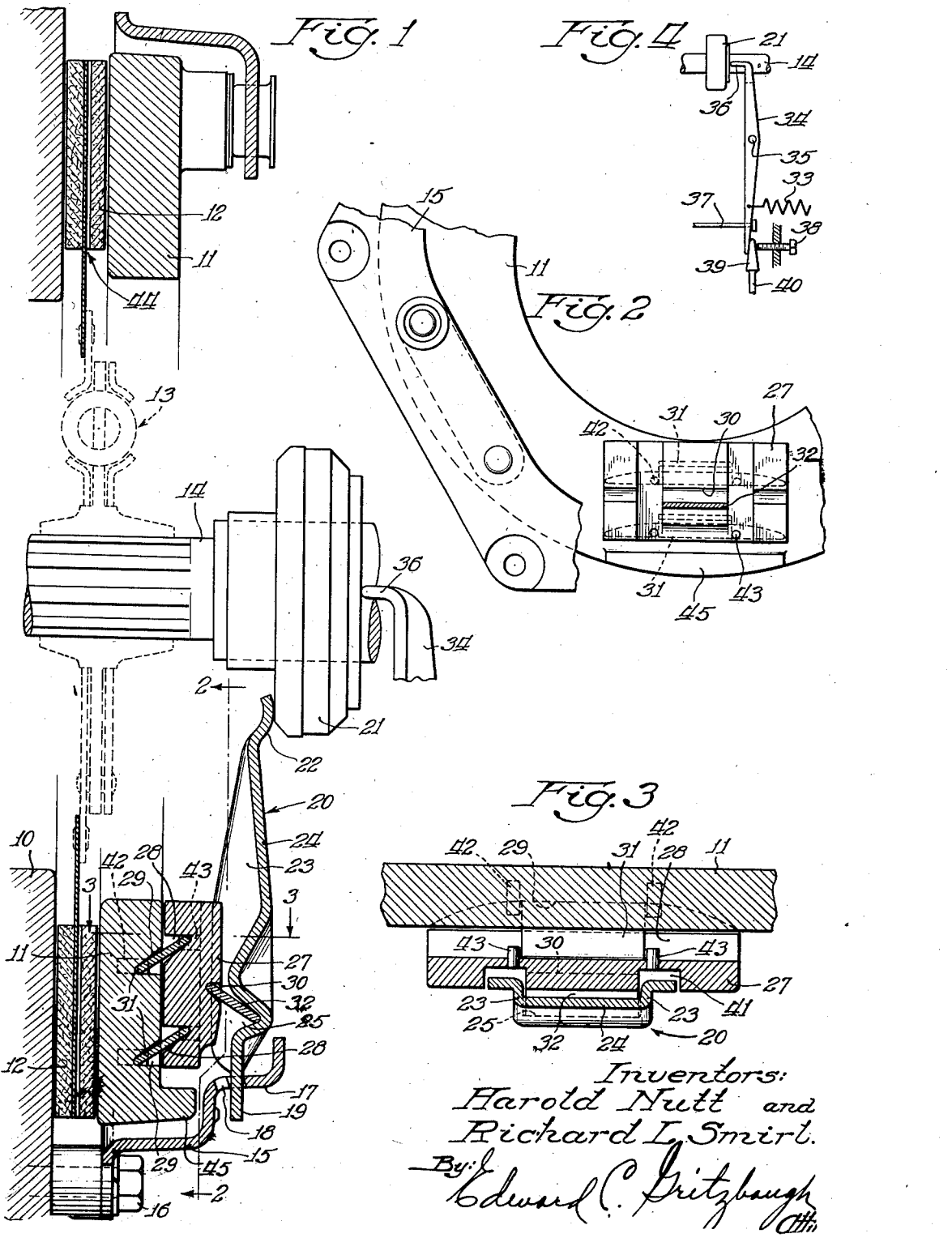
Dec. 5, 1944. H. NUTT ET AL 2,364,310
FRICTION CLUTCH
Filed May 8, 1941
Inventors:
Harold Nutt and
Richard L. Smirl.
By Edward C. Gritzbaugh

2,364,310

UNITED STATES PATENT OFFICE 2,364,310

FRICTION CLUTCH

Harold Nutt, Chicago, and Richard L. Smirl, Bellwood, Ill., assignors to Borg-Warner Corporation, Chicago, Ill., a corporation of Illinois Application May 8, 1941, Serial No. 392,434

9 Claims. (Cl. 192—103)

This invention relates to centrifugally acting friction clutches and has as its object to provide a centrifugal clutch having new and improved features and extremely simplified construction.

The conventional centrifugal clutch embodies a plurality of centrifugal weights, a reaction member against which the weights react, manual over-control mechanism, a group of springs to resist the centrifugal force of the weights at the highest idling speed for which no engagement is desired, and another group of springs to resist the reaction of the weights at the lowest speed for which no slip is desired; these limits determining the range over which engagement is subject to centrifugal control.

A specific object of the invention is to reduce the requirements of the first mentioned group of springs to a point where they may be replaced by a group of light flexible elements functioning for retracting the pressure plate and having the additional function of transmitting drive to the pressure plates. The invention replaces the second mentioned group of springs by a single external spring which fills the same requirements with less than half the material due to the fact that it is not exposed to the heat of the interior of the clutch, and due to the further fact that it eliminates a number of dead end coils.

The invention simplifies the manual over-control members and incorporates in them the function of the weight reaction members.

A further object of the invention is to improve the centrifugal control and to reduce the size requirements of the weights by providing a variable ratio weight mechanism having relatively low mechanical advantage in the initial stages of engagement progressing to a relatively high mechanical advantage in the final stages of engagement and thereby obtaining a softness of action in the initial stages comparable to that obtained in prior clutches only by greatly expanding the range of slippage.

Another object of the invention is to provide a centrifugal clutch in which the centrifugal mechanism is self-locking in the fully engaged position of the clutch, and does not release until the speed of rotation of the clutch has dropped considerably below the speed at which it becomes locked.

Other objects, the advantages and uses of the invention will become more apparent after reading the following specification and claims, and after consideration of the drawing forming a part of the specification wherein:

Fig. 1 is an axial sectional view of a clutch embodying the invention;

Fig. 2 is a rear elevation, partly in section of a portion of the clutch;

Fig. 3 is a detailed section view taken on the line 3—3 of Fig. 1; and

Fig. 4 is a schematic view of a control means for the clutch.

As an example of one form in which the invention may be embodied, I have shown in the drawing a centrifugal friction clutch comprising a driving member 10, which may be the flywheel of a motor vehicle engine, a pressure plate 11, and a driven plate 12 adapted to be engaged between the driving member 10 and the pressure plate 11. The driven member 12 is mounted, through the medium of suitable torque cushioning and vibration absorbing mechanism 13, on a driven shaft 14. The friction facing portion of the driven plate 12 includes cushioning mechanism 44 adapted to yield as the driven member is clamped between the driving member 10 and the pressure plate 11.

An annular reaction member 15 is secured as at 16 to the driving member 10 and has fulcrum portions 17 provided with fulcrum openings 18 in which are fulcrumed the outer end regions 19 of thrust transmitting levers 20. Mounted on the shaft 14 for axial movement, is a thrust bearing 21 which engages the inner ends 22 of the levers 20. There are preferably three of the levers 20 disposed in equal circumferential spacing around the axis of the clutch. Each of the levers 20 is formed with side flanges 23 and with a web portion 24 which is formed to provide a strut receiving notch 25.

Between the pressure plate 11 and the lever 20 a centrifugal weight 27 is confined for radial movement under the effect of centrifugal force.

Interposed between one side of the weight 27 and the pressure plate are a pair of struts or compression links 31. Interposed between the other side of the weight 27 and the lever 20 is an additional strut or compression link 32. The struts 31 are each received in a pair of notches 28 and 29 formed respectively in the weight and pressure plate. One end of each strut 31 is confined against circumferential movement relative to the pressure plate by a pair of pins 42 mounted in the pressure plate and extending into the notch 29. The opposite end of each strut 31 is confined circumferentially between a pair of pins 43 set in the weight 27 and extending into the notch 28. Thus the struts support the weight 27 against circumferential displacement while permitting the weight to move freely under the action of centrifugal force.

It is contemplated that thrust will be transmitted to the bearing 21 by a spring such as the spring 33 shown schematically in Fig. 4. The pull of the spring 33 may be transferred to the thrust bearing through a lever 34 pivoted at 35 to a fixed support member, the inner end 36 of the lever engaging the bearing 21 as shown. The bearing 21 may be relieved of the load of the spring 33 by manual release mechanism including a link 37 connected to the outer end of the lever 34. The link 37 may be operated by any suitable manual control means such as a clutch throwout pedal.

The mechanism just described may, in detail, be constructed in the manner disclosed in Reed Patent 2,250,394. The spring 33 acting through the lever 34, the thrust bearing 21 and the clutch levers 20, provides an abutment force against which the centrifugal mechanism described above may react in order to effect engagement of the clutch. Stated somewhat differently, it provides sufficient pressure against the thrust bearing 21 so that the latter may act as an abutment against which the levers 23 may react under the centrifugal force developed in the centrifugal mechanism.

Means is provided to limit the position to which the thrust bearing 21 can be moved under the pull of the spring 33, in order that the centrifugal mechaniism may be operative to effect engagement and disengagement of the clutch. Such means comprises a manually adjustable stop screw 38 and an automatically adjustable wedge 39 interposed between the end of the stop screw 38 and the end of the lever 34. The wedge 39 is connected by an operating rod 40 to the gear shift mechanism, and its purpose is to vary the abutment position automatically in accordance with changes in the gear ratios in the transmission with which the clutch is associated. In the operation of the clutch, assuming that the driving member 10 is commencing to rotate, the centrifugal weights 27 will react against the struts 31 and 32 with a toggle action, tending to straighten them out toward a position normal to the plane of the pressure plate and thereby increasing the distance between the remote ends of the struts. The strut 32 will react against the pressure of the spring 33, transmitted through the bearing 21 and lever 20, and the struts 31 will transmit axial movement to the pressure plate 11, moving the same into engagement with the driven plate 12. The pressure plate 11 will then react against the resiliency of the cushioning mechanism 44 in the driven plate 12, gradually compressing the same as the centrifugal pressure increases under increasing speed of rotation. Thus the struts 31 and 32 will gradually straighten out toward positions normal to the plane of the pressure plate with an ascending ratio of multiplication in resolving the centrifugal force into axial pressure.

The cushioning mechanism 44 has a corresponding ascending ratio of resistance to compression, the strut mechanism being arranged in such a manner that its ratio of multiplication substantially balances the ratio of cushion resistance throughout the range of clutch slippage during engagement, or during a major portion of such range. The desired ascending ratio of cushion resistance may be attained by employing a well-known multiple stage type of cushioning mechanism such as that shown, for example, in Nutt et al. Patent No. 2,101,411, embodying an annular series of spring sheet metal cushions interposed between the facings and distorted axially in waved portions some of which are in contact with the facings at all times and others of which come into action after an initial stage of compression has been completed. In a facing cushioning mechanism of this type there is a gradual build-up of cushion resistance. This gradual increase in resistance arises partly from the multiple stage action and partly from the inherent characteristic of a bowed spring member of increasing its resistance to flattening as it approaches a flat plane. By proper selection of material and design of the cushion it is possible to roughly conform the cushion resistance curve to that of the ratio of multiplication of centrifugal force. The position of the centrifugal weights at any given stage of operation is determined by a balance which must exist between centrifugal force tending to move the weights radially outwardly and the radial component of the axial forces which are delivered diagonally through the struts from the pressure plate and levers 20 to the weights. As the weights move outwardly, this radial component, for a given strut pressure, will diminish as a result of the increase in the angle between the struts and the plane of the pressure plate. In order to maintain the equilibrium of the weights it is therefore necessary for the axial forces to increase sufficiently to offset the decrease in ratio between this radial component and the centrifugal force against which it is balanced. This is accomplished by providing for an increase in cushion resistance.

At the point of full initial clutch engagement, cushion resistance becomes greater than the pull of the springs 33. At this point the weights have approached but are still somewhat spaced from stop lugs 45 formed on the pressure plate 11. In order for the weights to move beyond this point, the centrifugal force must increase sufficiently to cause the spring 33 to yield. When the pull of the spring 33 has been thus overcome, the weights will snap out into contact with the lugs 45, the radial component of strut pressure decreasing as they do so, owing to the increased strut angle without a corresponding increase in the pull of the spring 33. In the outer limit positions of the weights, the strut angle will be somewhat less than 90° so as to maintain some radial component of strut pressure, effective for moving the weight inwardly upon the attainment of a sufficient drop in the centrifugal force. However, such radial component is sufficiently less than that existing at the point of initial full clutch engagement so that the vehicle may be driven down to a speed very much lower than the speed at which initial full clutch engagement was attained, before the centrifugal force will have dropped to a point below such radial component of strut pressure, and permit the latter to become effective to move the weights inwardly for releasing the clutch. This result is in effect a temporary lockout of the weights in their terminal positions, and the terminal positions will be referred to as "lockout positions." The point where decreasing centrifugal force is finally overcome by the reduced radial component of strut force, upon deceleration, may be correspondingly called the point of unlocking of the weights. Similarly, the speed at which the radial component of the pressure exerted by the spring 33 is overcome and the weights snap out to their lockout positions, will be designated the "lockout speed."

The connection between the wedge 39 and the gear shift mechanism is such that in high gear ratio the thrust bearing 21 will have been permitted to recede to a position wherein the lockout speed is lowered sufficiently to avoid excessive clutch slippage where starts are made in high gear. Reducing the lockout speed permits the clutch to pass through the stage of centrifugal engagement more rapidly for a given amount of acceleration in the speed of rotation of the clutch. This compensates for the slower rate of acceleration which is characteristic of third-speed operation as contrasted to first or intermediate gear ratios. This arrangement produces the additional advantage of lowering the critical speed of disengagement to a point where the clutch will not be subject to damage in the event the engine should stall at full throttle. In the lower gear ratios, the clutch will be operable for both centrifugal engagement and centrifugal disengagement.

The invention makes it possible to have an initial engagement speed and an unlocking speed of substantially the same figure, with a lockout speed that is much higher. For example, the initial engagement speed may be 650 R. P. M., the lockout speed may be about 1400 R. P. M. and the unlocking speed may be in the neighborhood of the initial engagement speed. Where the unlocking speed is higher than the initial engaging speed, an undesirable effect may become manifest under certain conditions of operation. Whenever the clutch is manually released while rotating at a speed above the initial engagement speed, the weights will travel to their locked out positions as the load is removed from the struts. In the event of such manual disengagement, followed by reengagement while the driving member of the clutch is rotating above the initial engagement speed but below the unlocking speed, the load imposed upon the struts by the reengagement will produce a radial component of force sufficient to overcome centrifugal force, causing the weights to unlock and move inwardly. If the speed at the moment of reengagement happens to be sufficiently below unlocking speed, the unlocking will be sudden and the weights will be kicked inwardly with some violence. In order to overcome this condition, the invention contemplates an arrangement wherein the unlocking speed will be slightly lower than the initial engaging speed.

The invention provides a superior centrifugal operation in that it provides a much softer initial action without extending the range of slippage. The softer action is the result of the variable rate of toggle action, which is low initially and increases as the weights move outwardly.

We claim:

1. In a friction clutch, a driving member, a pressure plate, a driven member to be engaged between the driving member and pressure plate, reaction means, and means for developing thrust between the reaction means and the pressure plate, comprising a centrifugal weight mounted for substantially radial movement, toggle struts interposed between one side of the weight and the plate and between the other side of the weight and said reaction means, said struts including, on at least one side of the weight, a pair of radially spaced struts, all of said struts being arranged in radially inwardly converging relationship in the disengaged position of the clutch and being adapted to move toward positions normal to the general plane of the pressure plate as the weight moves outwardly.

2. In a friction clutch, a driving member, a pressure plate, a driven member arranged to be engaged between the driving member and the pressure plate, reaction means, and means for centrifugally developing thrust between said reaction means and the pressure plate, comprising a radially movable weight and a strut interposed in series between the reaction means and the pressure plate, said strut having its angular relation adjusted by the radial movement of said weight to resolve the centrifugal force of the weight into axial thrust against the plate in an ascending ratio as the weight moves outwardly, and said driven member including resilient facing cushioning means adapted to resist compression in an ascending ratio substantially balancing the ratio of increase in said axial thrust throughout the range of clutch slippage.

3. A clutch as defined in claim 2, wherein full clutch driving engagement occurs when the weight is intermediate its fully retracted and fully extended positions, whereby said ascending ratio of axial thrust and the descending ratio of radial inward thrust become effective to lock out the clutch against disengagement except at a considerably lower speed than that at which engagement occurs.

4. In a friction clutch, a driving member, a pressure plate, a driven member arranged to be engaged between the driving member and pressure plate, reaction means, and means for developing thrust between the reaction means and the pressure plate for engaging the clutch, said means comprising a centrifugal weight, said weight and pressure plate having opposed notches, and a strut the respective ends of which are received in said notches, arranged to resolve the centrifugal force of the weight into thrust directed axially against the plate in an ascending ratio as the weight moves outwardly.

5. In a friction clutch, a driving member, a pressure plate, a driven member to be engaged between the driving member and pressure plate, a reaction member carried by the driving member, a thrust transmitting lever the outer end of which is fulcrumed on the reaction member, means for applying thrust to the inner end of the lever, and means for transmitting said thrust from the lever to the pressure plate and for centrifugally developing thrust between the lever and the pressure plate, comprising a centrifugal weight mounted for substantially radial movement between the lever and plate, said lever, weight and plate having opposed notches, and thrust transmitting struts the ends of which are received in said notches, interposed between the weight and the plate and between the weight and the lever respectively, said struts converging toward the axis of the clutch when the clutch is disengaged and being adapted to move toward positions substantially normal to the plane of the pressure plate as the weight moves outwardly, thereby exerting a toggle action between the lever and the plate and resolving the centrifugal force into thrust directed axially against the pressure plate in an ascending ratio as the weight moves outwardly.

6. A clutch as defined in claim 5, wherein there are two of the struts between the weights and the pressure plate and a single strut between the weight and the lever.

7. In a centrifugal clutch, a driving member, a pressure plate, a driven member to be engaged between the driving member and pressure plate, a reaction member attached to the driving member, a shaft on which the driven member is mounted, an axially movable thrust bearing, a spring for applying thrust to said bearing, a lever fulcrumed on the reaction member and arranged to receive such thrust from the bearing, means for transmitting such thrust from the lever to the pressure plate and for centrifugally developing thrust between the lever and the pressure plate, said last means comprising a centrifugal weight and a thrust transmitting strut interposed in series between the lever and the pressure plate, said strut having a toggle action and being arranged to resolve the centrifugal force into thrust directed axially against the pressure plate in an ascending ratio as the weight moves outwardly.

8. A clutch as defined in claim 7, including positioning means opposing the action of said spring on said bearing.

9. A clutch as defined in claim 7, wherein said driven member includes resilient facing cushioning means adapted to resist compression in an ascending ratio substantially balancing the ratio of increase in said axial thrust throughout the range of clutch slippage, wherein full clutch driving engagement occurs when the weight is intermediate its fully retracted and fully extended positions, and wherein said spring is adapted to yield so as to permit said weight to move to its fully extended position and to act through said ascending ratio of axial thrust to lock out the clutch against disengagement except at a considerably lower speed than that at which engagement occurs.

HAROLD NUTT.
RICHARD L. SMIRL.